(No Model.)

J. NORTH.
MOLDING MACHINE.

No. 274,646. Patented Mar. 27, 1883.

Witnesses.
Robert Everett.
J. A. Rutherford

Inventor:
John North.
By James L. Norris
Atty.

(No Model.)　　　　　　　　　　　　　　　　　5 Sheets—Sheet 3.
J. NORTH.
MOLDING MACHINE.

No. 274,646.　　　　　　　　　　Patented Mar. 27, 1883.

Witnesses.
Robert Everett
J. A. Rutherford

Inventor.
John North,
By James L. Norris
Atty.

(No Model.) 5 Sheets—Sheet 4.
J. NORTH.
MOLDING MACHINE.
No. 274,646. Patented Mar. 27, 1883.
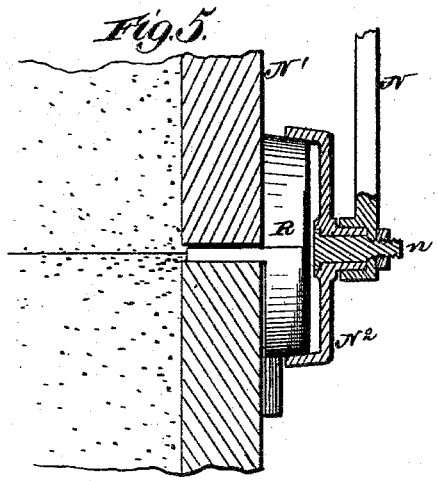
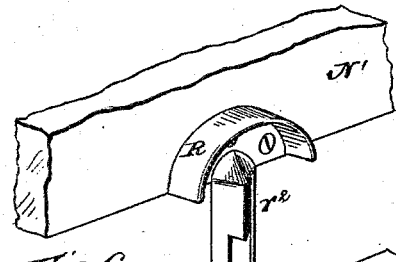
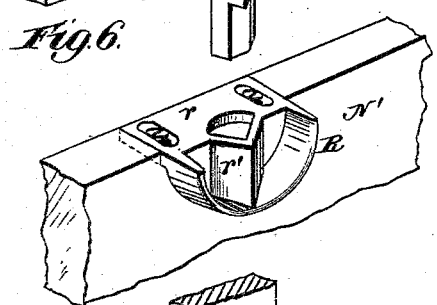
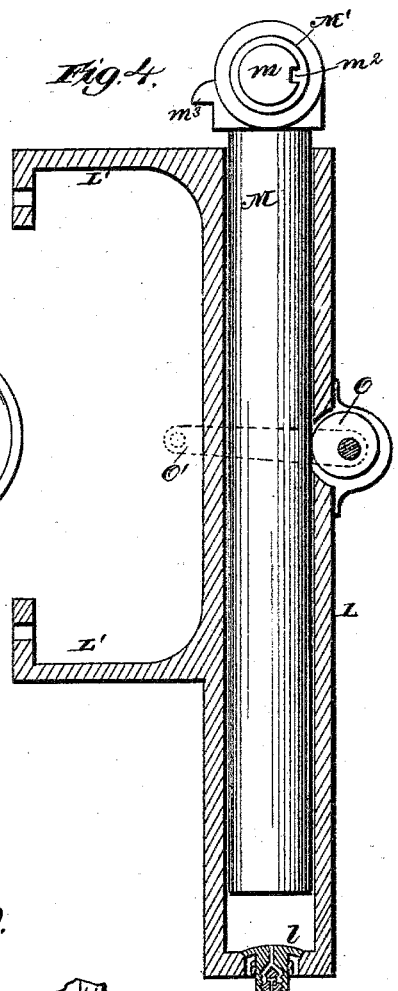
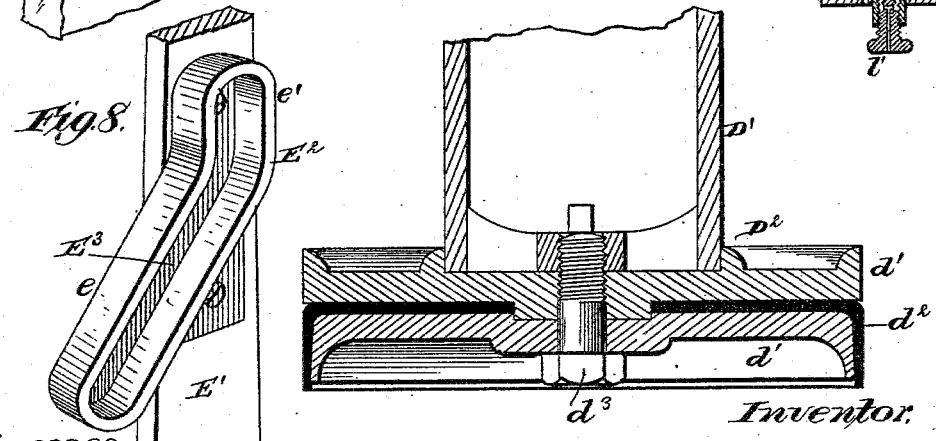
Witnesses.
Robert Everett
J. A. Rutherford
Inventor,
John North.
By James L. Norris.
Atty.

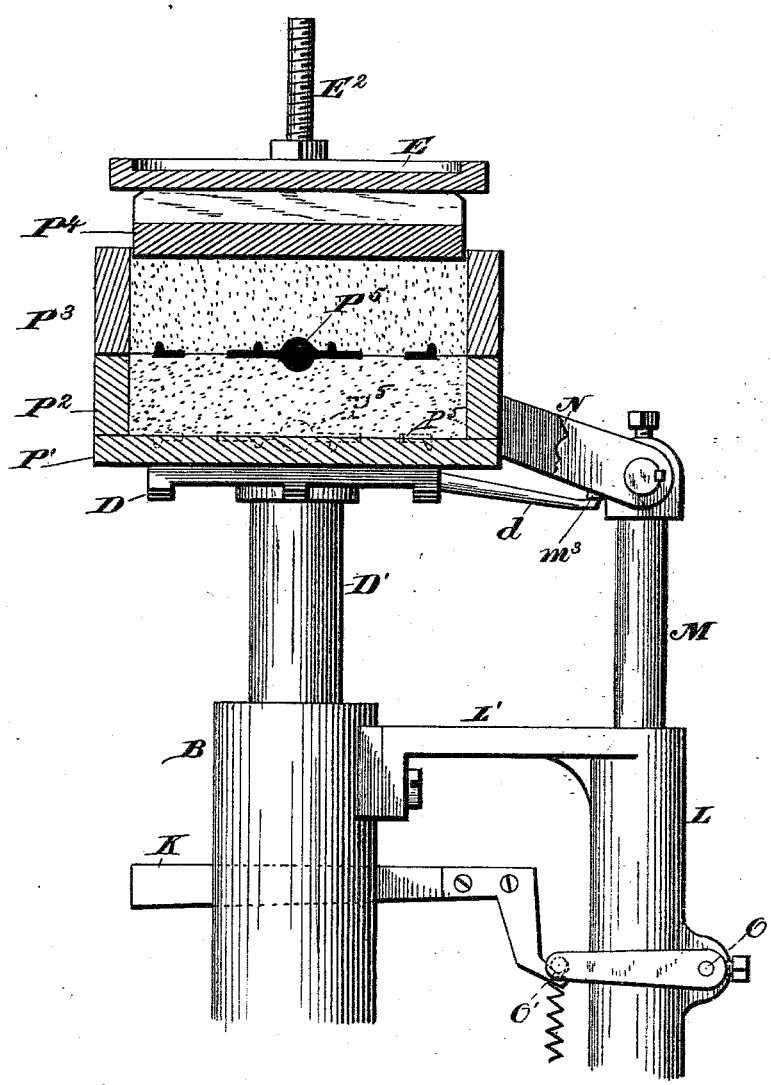

UNITED STATES PATENT OFFICE.

JOHN NORTH, OF MIDDLETOWN, ASSIGNOR, BY DIRECT AND MESNE ASSIGNMENTS, TO J. H. WHITTEMORE, OF NAUGATUCK, CONNECTICUT.

MOLDING-MACHINE.

SPECIFICATION forming part of Letters Patent No. 274,646, dated March 27, 1883.

Application filed July 31, 1882. (No model.)

*To all whom it may concern:*

Be it known that I, JOHN NORTH, a citizen of the United States, residing at Middletown, in the county of Middlesex and State of Connecticut, have invented new and useful Improvements in Molding-Machines, of which the following is a specification.

This invention relates to that class of molding-machines in which the flask is placed upon a table or platen which rises and carries the flask against an overhanging stationary platen, which latter is capable of being swung back out of the way after the required pressure has been obtained. In some instances the upper platen has been turned backward from over the flask while the molding is being done and then brought forward for the compression, the lever employed for giving pressure being also employed for moving the upper platen.

The primary object of my invention is to dispense with the use of hand-levers and to adapt the platens to be moved by means of a piston, to which an upstroke is given by means of compressed air, whereby the operator can control the operation of the machine by simply turning the handle of a cock, which regulates the flow of air.

A further object is to improve the construction of various parts of the machine, as hereinafter described.

Figure 1:
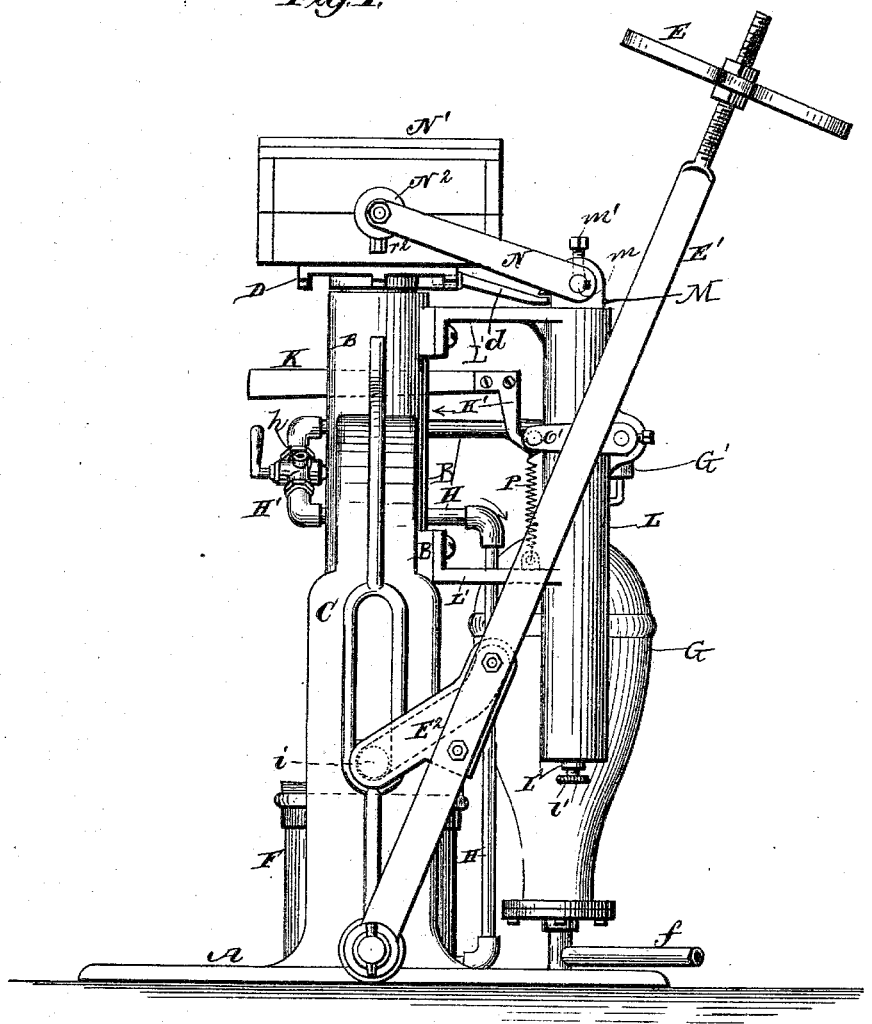
Figure 2:
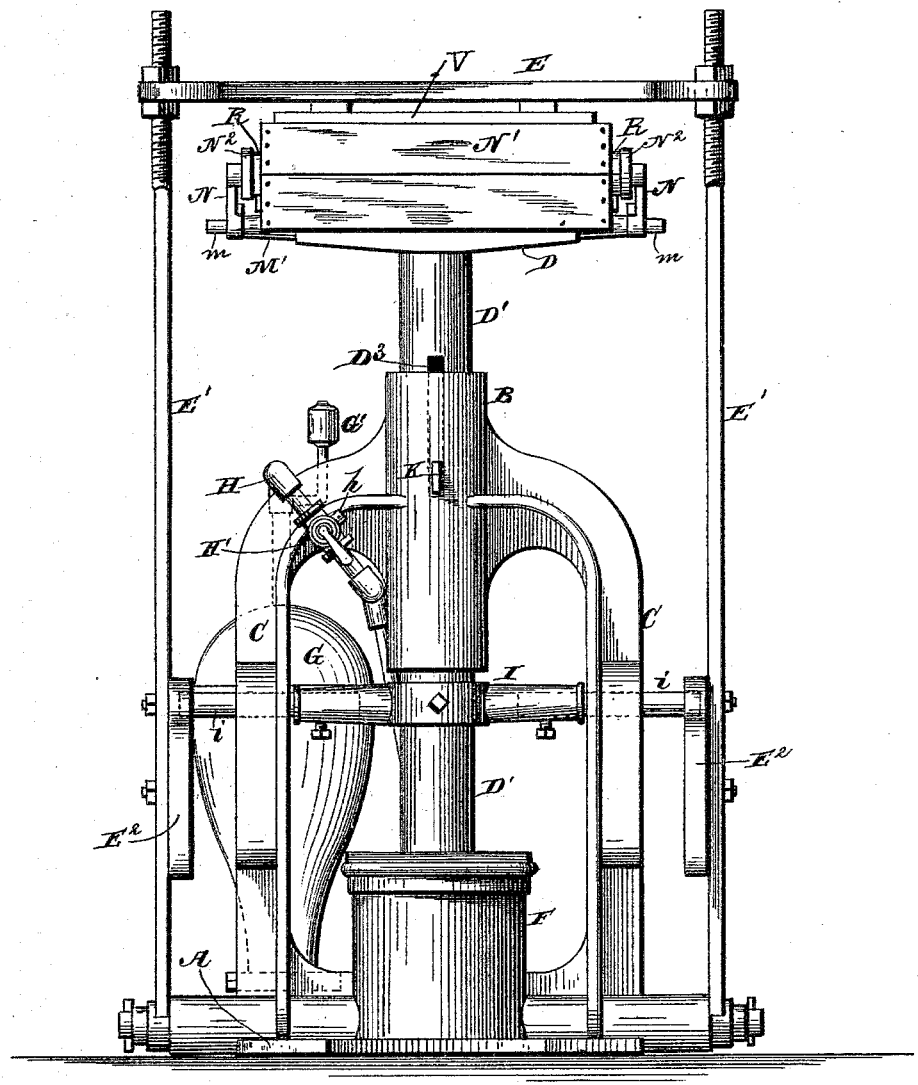
Figure 3:
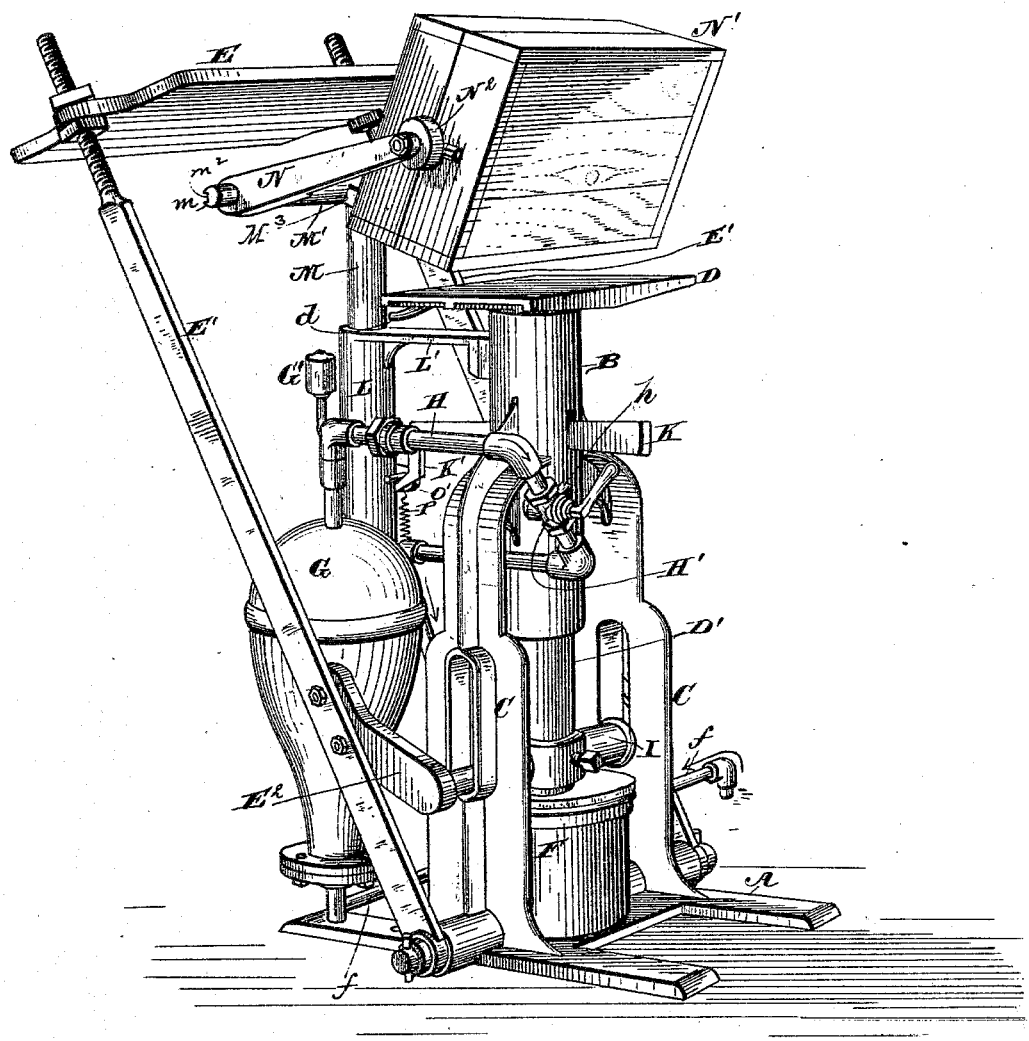

In the drawings, Figure 1 is a side elevation of the machine with the lower platen at its lowest point, and the upper platen swung back. Fig. 2 is a side elevation of the same, viewed at right angles to Fig. 1. Fig. 3 is a perspective view of the same with the flask partially upturned. Fig. 4 is a detail showing the vertically-movable standard which supports certain devices for carrying the flask. This view illustrates the eccentric for holding the standard in an elevated position, and also shows in section the cylinder in which the standard slides. Fig. 5 is a section through a portion of one end of the flask, and shows the devices for pivotally supporting the same. Fig. 6 shows portions of the two parts of the flask with their attachments. Fig. 7 represents one of the cup-shaped bearings for the journals of the flask. Fig. 8 illustrates one of the cam-slots which is employed for giving the swinging movement to the arms carrying the upper platen. Fig. 9 is an enlarged section through the piston-head. Fig. 10 is a detail view, illustrating the manner of forming the mold.

The main stationary frame of the machine comprises a base, A, and an elevated tubular guide, B, supported by the two slotted side standards, C, which rise from the base and at their upper inwardly-bent ends connect with the said tubular guide.

D indicates the lower vertically-movable table or platen upon which the flask is to be placed preparatory to compression, and E denotes the upper platen, against which the removable top board within the flask is pressed during the upward movement of the platen carrying the flask. The lower platen, D, is supported upon a vertical piston, the rod D' of which works through the tubular guide B, and carries at its lower end the piston-head $D^2$, working within the cylinder F, which is seated upon and secured to the base portion of the main stationary frame.

The means for storing up power to give the required upstroke to the piston when occasion requires consists of an air-receiver, G, into which air can be forced and compressed from some suitably-located air-pump, the pipe-connection $f$ between said pump and receiver being, if preferred, carried under the floor of the building. This air-receiver, which is provided with a properly-constructed safety-valve, (indicated at G',) connects with the lower part of the piston-cylinder F below the piston by means of suitable pipe-connection, H. This pipe-connection is provided with an ordinary three-way cock, (indicated by the letter H',) and with an escape, $h$, located with relation to the three-way cock so that while the latter is turned to admit air to the piston-cylinder the escape shall be closed, and also so that the said cock can be turned so as to cut off the flow of air from the receiver and open communication between the piston-cylinder and the escape when it becomes desirable to allow the air below it to escape and the piston to descend.

The upper platen, E, is adapted to swing over the lower platen, and also to swing back from the same, its movements being controlled by the action of the piston in the following manner: The said upper platen is adjustably secured upon the upper screw-threaded ends of the two swinging rods E' by means of nuts or analogous devices, and these swinging rods which thus support the upper platen are pivoted at the base of the machine, and each carry a cam-grooved block or casting, E², the lower and longer portion, $e$, of the groove E³ of each being at an angle to the axis of the rod, while the upper portion, $e'$, of the groove runs parallel with said axis.

A cross-head, I, is adjustably secured to the piston-rod by means of a set-screw passing through a collar, which fits upon the piston-rod and constitutes the middle portion of the cross-head. The arms of this cross-head are formed with sockets, in which the short arms or rods $i$ are adjustably secured by means of set-screws. These extensible arms of the cross-head pass through vertical openings in the side C of the frame and work in the grooves of the blocks E². Hence the downstroke of the piston will cause the rods carrying the platen to swing back into the position shown in Fig. 3, while a reverse movement on the part of the piston will bring the rods into a vertical position, and consequently move the upper platen, E, into position over the lower platen. The upstroke of the piston is regulated by means of a tapering key, K, which passes through the guide B, and also through the piston-rod. The piston-rod is formed with a slot, D³, for the passage of the key, this said slot being made of sufficient length to allow the required stroke of the piston, while the slots in the tubular guide for the key are just long enough to allow the key to be slid in the direction of its length. The upward pressure of the lower platen can thus be regulated, since as the key is made tapering throughout its length. The upstroke of the piston will be determined by the width of that portion of the key against which the walls of the lower end of the piston-rod abut during the upstroke of the latter.

L indicates a cylinder, which is secured to the tubular guide B by means of arms L', projecting laterally from the said cylinder. A vertically-movable standard, M, which is fitted to work up and down within the cylinder L, carries at its upper end a hollow cross-head, M', having fitted therein a shaft, $m$, which is prevented from rotation in the hollow cross-head by means of a set-screw, $m'$, shown in Fig. 1. This shaft is provided at its ends with a groove, $m^2$, (shown in Fig. 4,) and the arms N, for supporting the flask, are slipped onto the grooved ends of the shaft $m$, and keyed thereon by means of keys $q$, which will be inserted in said grooves in the shaft and in corresponding grooves which will be found in the arms. The arms are thus held rigid upon the shaft, which is in turn held in rigid connection with the cross-head. This arrangement admits of the adjustment of the arms so as to suit flasks of different thicknesses—as, for example, if a flask not so thick or deep as the flask N', herein shown, is to be used, the arms N can be lowered after the set-screw $m'$ has been loosened so as to allow the shaft to be turned, and the upper platen can be correspondingly lowered upon the swinging rods E'.

The lower platen is provided with an arm, $d$, which, when said platen is raised by the piston, strikes against a lip, $m^3$, projecting from the cross-head M', and thereby causes said cross-head, with the standard M and the arms supporting the flask, to rise simultaneously with the lower platen; but after the piston has reached the limit of its upstroke, and the cock turned so as to allow the air under the piston to escape and the piston and lower platen to descend and the upper platen to swing back, it becomes necessary to maintain the flask, which is pivoted between its arms, in an elevated position long enough to allow it to be turned. To such end I provide the cylinder L with a suitable bearing for the pivot of an eccentric, O, which is located so as to be extended through a slot in the cylinder. During the upward movement of the standard M this eccentric will be thrown back by the latter, and in no wise interfere with the free movement thereof; but as soon as the standard M begins to drop it will cause the eccentric to turn in a reverse direction, so that the eccentric will bind upon the standard and check its downward movement. An arm, O', is secured upon the pivot of the eccentric, and a spring, P, connecting said arm with one of the arms L' of the cylinder L, tends to draw the arm O' down and hold the eccentric against the standard M. This arm also subserves another purpose, since when it is desired to lower the flask-supporting devices the key K can be pushed inwardly—that is to say, its longer end moved toward the piston-rod, so that an arm, K', depending from the smaller end of said key, and having a wedge-shaped or inclined end, will act upon and raise the arm O', and thus throw the eccentric back from the standard.

In order to prevent the standard M from dropping with too great a shock, I provide for an air-cushion below the same by arranging in the lower end of the cylinder L a valve, $l$, having a screw-threaded bore to receive a nipple, $l'$. This valve has an air-passage leading upwardly from its screw-threaded bore, and the nipple has an axial air-duct leading from its lower to near its upper end, at which point the duct branches off, and thus allows the air to enter and pass through the valve, or to pass in a reverse direction. In this way, as the standard descends, its descent will be rendered gradual, by reason of the air-cushion below it, while as the standard rises the valve will be lifted from its seat.

In order to hold the two parts of the flask N' together, and at the same time to pivotally support the flask between the arms N, I provide the following devices: At the ends of the flask a half-cup-shaped casting, R, provided with a slotted base-flange, $r$, is secured to each part or half of the flask, so that when these two parts of the flask are fitted together a hollow cylindrical journal will be provided at each end thereof, as indicated in Fig. 5. One casting, R, at each end of the flask is provided with a socket, $r'$, made rectangular in cross-section, and the opposing casting is provided with a shouldered pin, $r^2$, which enters said socket, and thus locks the parts together. The arms N are each provided with a cup, $N^2$, secured to the arm by a screw, $n$, passing through a hub on the cup, which sets into a socket in the arm. The two-part journals formed by the castings R are received and turn in these cups $N^2$, so that the flask can be turned when necessary.

The piston $D^2$ is composed of two parts, $d'$ $d'$, with a cup-shaped washer, $d^2$, between them, and these two parts of the piston are secured together and connected with the hollow stem by means of a suitable screw-bolt, $d^3$, as illustrated in Fig. 9.

Having thus described the construction and functions of the several parts of the machine, the general operation may be summed up as follows: The piston and its attached bed being down, the cock is turned so as to admit air below the piston, which, as it rises, brings the rods $E'$ into a vertical position by means of the ends of the cross-head I working in the slotted curved castings $E^2$, and the attached platen is thus brought immediately over the bed. At the same time the arm $d$, acting on the lip $M^3$ of cross-head $M'$, raises the standard M. By reversing the cock the air is allowed to escape from beneath the piston, and the bed falls, leaving the standard M secured in an elevated position by the eccentric O. At this time the flask may be reversed on the cups or trunnions $N^2$, when by pushing in the key K the standard falls and lowers the flask to the bed, and a repetition of the operation may be had, as required, in the act of forming a mold, which is as follows, reference being had particularly to Fig. 10: An ordinary match-board, $P'$, with the pattern $P^5$ resting freely thereon, as shown in dotted lines, is first laid upon the bed D when in its lowest position, a half-flask placed upon the match-board and filled with sand and leveled off in the usual manner. The press or follow-board $P^4$ is then placed upon the sand, and it is compressed by the machine, as described, the upper platen and sliding wedge having been adjusted according to the thickness of the half-flask. The bed is now lowered, a cope-board substituted for the press-board, and the half-flask turned or reversed, and the match-board is removed, leaving the pattern in the sand. The upper half-flask is now put on and the sand compressed, as before, (Fig. 10 shows the parts at this stage, the pattern $P^5$ being in black,) the key K having been adjusted so that the pressure shall cease before it disturbs the work accomplished in the lower half-flask. The cope is then removed and the pattern drawn. This completes the making of a mold.

Having thus described my invention, what I claim is—

1. The combination, in a molding-machine, of the vertically-moving lower platen with a piston actuated by compressed air for raising the lower platen, and the upper swinging platen with connecting devices actuated by the piston for causing said upper platen to be automatically moved over the lower platen during the ascent of the latter and to be automatically swung back during the descent of the same, substantially as described.

2. The combination, in a molding-machine, of the lower platen with a piston for raising and lowering said platen, an air-receiver with pipe-connection between the receiver and the piston-cylinder and the upper swinging platen with means, substantially as described, for moving the upper platen over the lower platen, while the piston is performing a portion of its upstroke, holding the upper platen stationary until the piston has completed its stroke and then swinging the upper platen back as the piston descends, substantially as set forth.

3. The combination, in a molding-machine, of the lower platen supported on a vertically-movable piston, and a slotted guide with the tapering sliding key K, for limiting the upstroke of the piston, substantially as described.

4. The combination, with the swinging rods supporting the upper platen, of the lower platen supported on a vertically-moving piston, and the arm extending from said piston into the cam-grooves $E^3$ on the swinging rods, whereby the several movements on the part of said rods and platen are attained, substantially as described.

5. The combination, with the vertically-movable standard M, of its upper cross-head carrying the arms which support the flask, and the lower platen adapted in its upward movement to raise said standard, substantially as described.

6. The combination, with the vertically-moving standard carrying devices for supporting the flask, of the lower platen provided with means for raising said standard, and means, substantially as described, for maintaining said standard in an elevated position while the lower platen descends, substantially as described.

7. The combination, with the vertically-moving standard carrying devices for supporting the flask, of the eccentric O, for maintaining said standard in an elevated position, and the key for releasing the eccentric from the standard, substantially as described.

8. The combination, with the vertically-movable standard M, carrying devices for supporting the flask, of the eccentric O, provided with an arm, $O'$, the spring for holding the eccentric in contact with the standard, and the key K, for raising the arm and releasing the eccentric from the standard, substantially as described.

9. The combination, with the standard M, provided at its upper end with a hollow cross-head, of the shaft adjustably secured against rotation within the cross-head, and the flask-supporting arms keyed upon the shaft, substantially as described.

10. The combination, with the vertically-movable standard having the cross-head carrying the devices which support the flask, of the cylinder L, in which the standard slides, and the valve at the lower end of the cylinder, substantially as described.

11. The combination, with the two-part flask, of its two-part cylindrical journals formed by the castings R and the cups $N^2$ on the arms N for supporting said journals, substantially as described.

12. The combination, with the castings R, secured to the two parts of a flask, of the socket $r'$, secured to one casting, the pin $r^2$, secured to the casting which fits thereto, and the cup $N^2$, supported on arms N, substantially as described.

13. The combination of the tubular guide B, supported by the side standards, C, of the main frame, with the piston-rod working through said tubular guide and supporting the lower platen, the cross-head I, secured to the platen and having its arms extending through the side standards, and means, substantially as described, for actuating the piston and the upper platen, as set forth.

In testimony whereof I have hereunto set my hand in the presence of two subscribing witnesses.

JOHN NORTH.

Witnesses:
J. SALE FAIRMAN,
ELIHU W. N. STARR.